April 20, 1965   R. V. PATTERSON   3,178,758
INTEGRAL-SPRING WHEEL
Filed Feb. 6, 1962
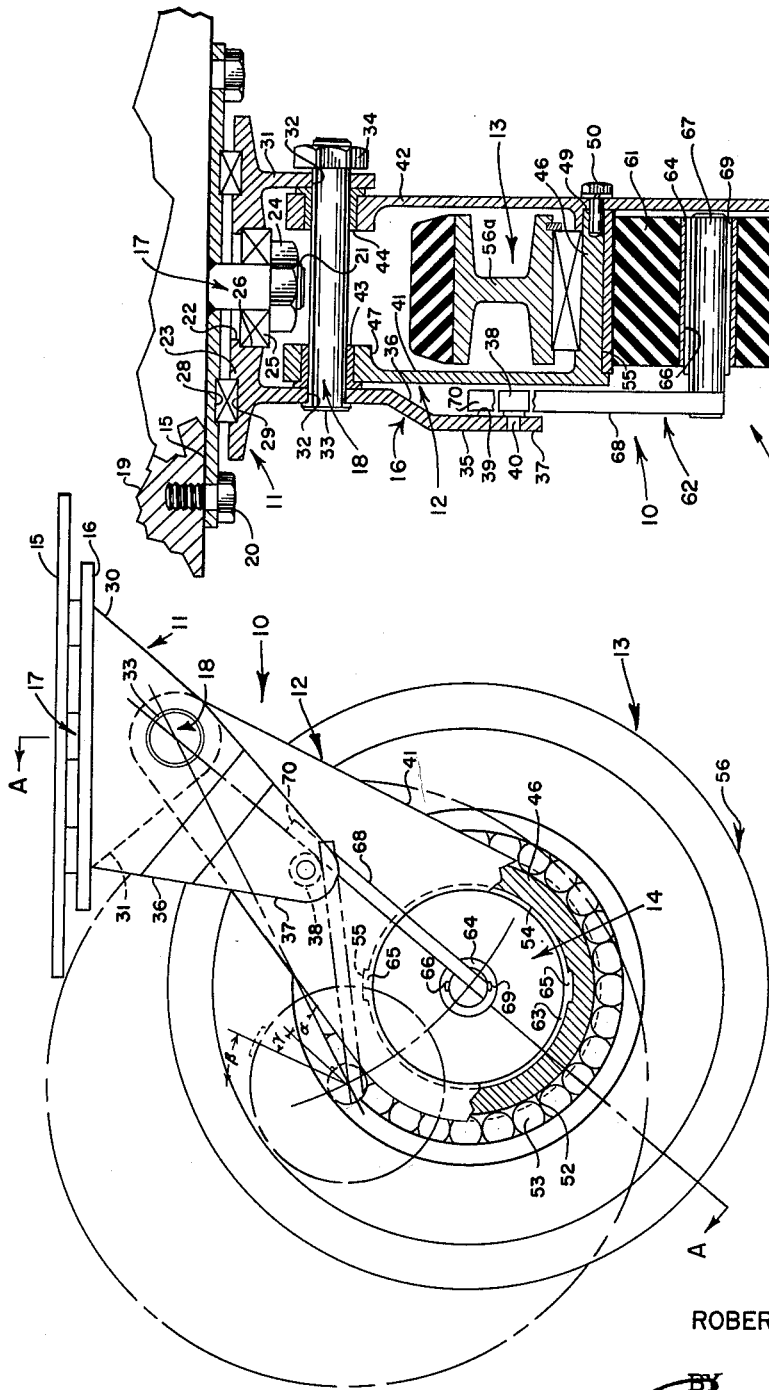
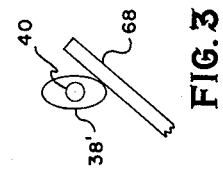
FIG. 1
FIG. 2
FIG. 3
ROBERT V. PATTERSON
INVENTOR
ATTORNEY

United States Patent Office 3,178,758
Patented Apr. 20, 1965

3,178,758
INTEGRAL-SPRING WHEEL
Robert V. Patterson, Monkton, Md., assignor to Aircraft Armaments, Inc., Cockeysville, Md., a corporation of Maryland
Filed Feb. 6, 1962, Ser. No. 171,425
15 Claims. (Cl. 16—44)

This invention relates to wheel suspension assemblies for vehicles, and more particularly to assemblies which utilize torsion-elastic means to spring the vehicle.

A torsion-elastic spring is a tubular rubber member having concentric inner and outer cylindrical surfaces which, when rotated relative to each other, set up torsional shear stresses in the rubber resiliently opposing the relative rotation. It is conventional to incorporate torsion-elastic springs into suspension assemblies by mounting the springs at the pivot connection between the wheel carrying member of the assembly and the vehicle. At a result, the pivot connection "floats" in the rubber spring. With this construction, a rubber spring is required to absorb, not only the torsional shear stresses induced by rotation of the pivot connection relative to the vehicle, but also tensile and compressive stresses and resultant shear stresses that arise from the wheel reaction load, transverse moments due to the wheel reaction, and lateral wheel loads. At certain cyclical loadings of the rubber spring that arise under various conditions of wheel speed and terrain, the suspension becomes unstable and the suspension system develops a self-sustaining oscillation commonly referred to as "shimmy."

If it were possible to prevent reaction loads, transverse moments and lateral wheel loads from being transferred to the rubber spring, the driving functions that sustain shimmy would be absent, and the suspension system would be stable. It is therefore an object of this invention to provide a wheel suspension assembly of the class described wherein only torsional shear stresses are able to be imparted to the rubber spring.

The invention will be described briefly after it is pointed out that the wheel arm is mounted on a bearing attached to the vehicle so that only pivotal motion of the arm is permitted. The bearing takes up all reaction loading, transverse moments and lateral loading. The wheel axle, upon which the road wheel is rotatably mounted, is made with an axially extending bore to which the outer cylindrical surface of the rubber spring is attached. The inner surface of the spring is attached to the vehicle through a suitable linkage in such a manner that pivotal movement of the wheel arm causes relative rotation of the cylindrical surfaces of the spring thereby inducing only the desired torsional stresses therein.

Still other objects, features and attendant advantages will become apparent to those skilled in the art from a reading of the following detailed description of one preferred physical embodiment constructed in accordance with the invention, taken in conjunction with the accompanying drawings wherein:

FIGURE 1 shows a wheel suspension assembly made in accordance with the present invention with parts broken away to better illustrate details, and showing two positions of the wheel means to illustrate how deflection of the wheel means sets up resilient resistance to such deflection.

FIGURE 2 is a sectional view, taken generally along the line A—A in FIGURE 1 but showing the key lugs of the inner and outer sleeves in section.

FIGURE 3 is a fragmentary view of a modification of the linkage arm and cam arrangement of FIGURES 1 and 2, providing for adjustment or variable control of spring loading response.

In the accompanying drawing, reference numeral 10 represents a suspension assembly made in accordance with the present invention. Assembly 10 has four main parts: (1) support means 11; (2) crank arm means 12; (3) wheel means 13; and (4) spring means 14.

Support means

Support means 11 includes mounting plate 15, support bracket 16, vertical pivot bearing means 17 and crank arm bearing mounting 18. Plate 15 is rigidy secured to vehicle 19 by bolts 20. Bearing means 17 includes pin 21 rigidly attached to plate 15 and extending downwardly through aperture 22 in the top plate 23 of bracket 16. Nut 24, threaded onto the free end of pin 21, engages thrust bearing 25 seated in counter bore 26 in plate 23 to retain roller bearings 27 in raceways 28, 29 in plates 15 and 23 respectively. In this manner, bracket 16 is secured to plate 15 for rotation on the vehicle about a vertical axis.

Support bracket 16 has a pair of spaced fork arms 30 and 31 attached to the underside thereof. Each fork arm has crank pin hole 32 therethrough into which headed crank pin 33 extends to define bearing mounting 18. The free end of pin 33 is threaded, and nut 34 retains the pin in the holes. Extension 35 on arm 30 has an outwardly extending inclined portion 36 and a cam mounting portion 37 at the free end of extension. Cam 38 is mounted on the inner surface 39 of portion 37 by means of pin 40.

Crank arm means

Crank arm means 12 includes elongated plates 41 and 42, crank arm bearing means 43, 44 in one end 45 of each plate, and axle means 46 at the other end of each plate. Each plate at end 45 has a boss 47 formed thereon provided with a hole somewhat larger than pin 33. Bearing means 43, 44 are constituted by shouldered bushings pressed into the holes in the bosses. The bushings are rotatably engaged over pin 33 so that crank arm means 12 is pivotal on support bracket 16. Since bracket 16 is a part of support means 11, crank arms means 12 can properly be described as pivotally mounted on support means 11.

At the end of plate 41 opposite end 45 is axle hub 48 that is integral with plate 41 and extends parallel to the axis of pin 33. Hub 48, which is a part of axle means 46, extends from plate 41 toward plate 42 and terminates in free end 49 which abuts plate 42 and is fastened there by bolts 50. Hub 48 has outer cylindrical surface 51 with portion 52 of reduced diameter forming a seat for wheel bearing 53, and a cylindrical bore 54 extending through the hub. Bore 54 is provided with a pair of opposite axial keyways 55 whose purpose will be made clear below.

Wheel means

Wheel means 13 includes road wheel 56 and wheel bearing 53. The latter is mounted on portions 52 of hub 48 as above described, and is retained in place by the edge of boss 57 on plate 42. Wheel 56 has hub 58 having counter bore 59 in which bearing 53 is seated. Snap ring 60 retains the wheel on the bearing. Wheel 56 has central web 56a extending radially from the center of hub 58 and terminating in a flange upon which rubber tire 56b is attached. Wheel 56 is thus freely rotatable about axle means 46, and the latter is freely rotatable about bearing mounting 18. Spring means 14 is used to spring the wheel on the vehicle.

Spring means

Spring means 14 includes torsion-elastic means, linkage arm means 62 and arm engaging cam 38. In the illustrated embodiment, the torsion-elastic means includes torsion-elastic spring member 61 which is a tubular rubber member having outer cylindrical sleeve 63 bonded to the outer surface and inner cylindrical sleeve 64 bonded to the inner surface. Outer sleeve 63 is provided with opposite key lugs 65 which project from the outer surface of the sleeve and extend axially therealong. Sleeve 63 is engaged in bore 54 of hub 48, and key lugs 65 are engaged in keyways 55 so that outer sleeve 63 is non-rotatable relative to the hub 48. Inner sleeve 64 is provided on its inner cylindrical surface with a pair of opposite axial keyways 66.

Linkage arm means 62 includes arm axle 67 and spring biased linkage arm 68. Arm axle 67 is engaged with the inner cylindrical surface of sleeve 64 and is thus co-axial with wheel means 13. Opposite axial key lugs 69 that project from axle 67 are engaged in keyways 66 in sleeve 64 so that axle 67 is non-rotatable relative to sleeve 64.

Spring biased linkage arm 68 is rigidly attached to one end of axle 67, and projects outwardly of plate 41 toward extension 35 on bracket 16. Arm 68 terminates in free end 70 adjacent to cam 38 which, as previously discussed, is mounted on the inner surface 39 of extension 35 by means of pin 40. Free end 70 extends below cam 38 and will be initially engaged with a portion of the outer annular surface of cam 38 at some angular position of the crank arm means 12, as, for example, the position illustrated in FIGURE 1, and at all greater angular positions of the crank arm means.

Operation

The operation of this assembly can best be understood by first recalling that bearing mounting 18 constrains movement of crank arm means 12 to rotation thereabout. Assume now that arm 68 is absent and that the wheel is rotated from the position shown in solid lines in FIGURE 1, which for convenience is termed "no-load" position, to the position shown in broken lines, which for convenience is termed "loaded position." The following discussion is concerned with the alignment of lugs 65 and 69. In the no-load position, the lugs 65 and 69 are in alignment, and if arm 68 is absent, rotation of the crank arm means through the angle $\beta$ to loaded position would not disturb the alignment. However, it is evident that the line connecting lugs 65 and 69 also rotates through the angle $\beta$ upon rotation of the crank arm means 12 from no-load to loaded position.

The presence of arm 68 introduces differential rotation between outer sleeve 63 and inner sleeve 64. This can be seen by noting that the line connecting the center of axle 67 with lug 69 of the spring arm means makes a fixed angle $\alpha$ relative to arm 68. Because free end 70 of arm 68 is engaged with cam 38 throughout pivotal movement of the crank arm means, rotation of the crank arm means through the angle $\beta$ causes arm 68 to be pivoted about the center of axle 67 through the angle $\gamma$. From the drawing, it can be seen that while rotation of the crank arm means through the angle $\beta$ has caused lugs 65 to rotate about the center of axle 67 through the same angle, such rotation has caused lugs 69 to rotate about the center of axle 67 through the angle $\beta+\gamma$. The difference in angular rotation of the inner and outer surfaces of torsion-elastic member 61, namely the angle $\gamma$, introduces only torsional shear stresses in the member which resiliently resists rotation of the crank arm means.

The term torsional shear, as used herein, means the shear between adjacent elemental surfaces which are parallel to the axis of twist as opposed to the shear between adjacent elemental surfaces which are normal to the axis of twist. The former type of shear arises in a torsion-elastic member while the latter type of shear arises in a torsion bar or the like. This is not to say that a torsion bar could not be used in the present device, because it obviously could. However, for a given size and weight, a torsion-elastic member is more efficient.

In summary then, the essence of this invention is presently believed to be the manner in which differential twisting between the axle of the spring arm means and the axle of the wheel is generated and used to create a torque which resists such twisting. While a torsion-elastic rubber member is disclosed as being the optimum medium for absorbing this torque, it is obvious that other types of absorbers could be used if so desired.

It will now be appreciated that with the above construction the only loads capable of being applied by the wheel to torsion-elastic member 61 are torsional loads. Hence, the driving or forcing functions which, when applied to a torsion-elastic member tend to sustain wheel shimmy, cannot be applied to torsion-elastic member 61.

Modifications

Other modifications readily suggest themselves. For example, the torsion angle $\gamma$ may be adjusted by varying the location of cam 38, thus effectively adjusting the spring resistive force at any given loaded position of crank arm means 12. Furthermore, the effective stiffness of torsion-elastic member 61 (or the rate at which the angle is generated in response to rotation of the crank arm means) can be adjusted or controlled by varying the contour of cam 38. For example, if the shape of the cam were elliptical as shown at 38' in FIGURE 3, the free end of arm 68 would be forced downwardly as the loading of the wheel increases faster than if the cam were circular. This means that as the load increases, the spring becomes effectively stiffer. Such construction permits soft rides and small wheel deflections while providing ample resistance to large wheel deflections.

While arm 68 is shown in contacting engagement with cam 38, it is evident that an adjustable link arrangement would be suitable. Furthermore, it is also evident that a torsion spring could be coiled around axle 67 in replacement of torsion-elastic member 61.

It will be appreciated that with the present wheel mounting arrangement the wheel is pivotally suspended from the wheel support by a crank arm whose pivotal movement is resiliently opposed by torsion-elastic spring element disposed within the wheel, but in which the torsion-elastic element is not a direct part of the suspension structure for the wheel, and particularly in which the torsion elastic element is disposed other than between the wheel and the wheel axle which is rigidly fastened to or fastened as part of the crank arm. This advantageous arrangement yields the excellent mounting and space advantages of a pivotally mounted wheel with its own integral load bearing spring, without the disadvantages present in previous torsion-spring-within-wheel suspensions wherein the torsion spring formed a resilient portion of the support-carried wheel mounting arrangement and thereby permitted side shimmy of the wheel, as well as vertical compressive loading of the torsion-elastic element, which disadvantages are substantially eliminated with the present invention.

While a single preferred physical embodiment has been illustrated and described, it will be apparent to those skilled in the art that various modifications may be made without departing from the scope and spirit of the invention. Accordingly, it is to be understood that the invention is not to be limited by the specific illustrative embodiment, but only by the scope of the appended claims.

What is claimed is:
1. A caster for a load carrying body comprising:
 (a) an arm having an axle defining a wheel axis;
 (b) a wheel mounted on said axle for rotation about said wheel axis;
 (c) means mounting said arm on said body for effecting rotation of said arm on said body about a mounting axis parallel to but displaced from said wheel axis and preventing movement of the latter out of parallel with said mounting axis;
 (d) a bore in said axle whose axis is co-linear with said wheel axis; and
 (e) torsion-elastic means comprising a tubular member having concentric inner and outer surfaces, means rigidly connecting the outer surface of said member to said bore, and means connecting the inner surface of said member to said body so that rotation of said arm on said body causes relative rotation between said surfaces.

2. A caster in accordance with claim 1 wherein said last named means includes:
   (a) a spring arm having one end rigidly connected to said inner surface; and
   (b) link means pivotally connected to said body and to the other end of said spring arm.

3. A wheel suspension comprising a support, a crank arm pivotally connected through a pivot connection adjacent one end thereof to said support and having a wheel axle carried thereon adjacent the opposite end thereof, a wheel rotatably mounted on said axle, said axle having a bore therein, a torsion-elastic element mounted in said axle bore, said torsion-elastic element being secured at one portion thereof in torque-transmitting relation to said axle, a movable mechanical linkage secured in torque-transmitting relation to said torsion elastic element at another portion thereof spaced from said first portion and linkage-movement-resistive means opposing movement of said linkage.

4. Apparatus according to claim 3 wherein said movable mechanical linkage includes a movable torque arm secured to said torsion-elastic element and said linkage-movement-resistive means includes a stop engageable by said torque arm and spaced from said pivot connection.

5. Apparatus according to claim 3 wherein said torsion-elastic element is an elastic tubular shaped element the outer annular surface of which is substantially rigidly mounted within said axle bore and relative to said axle, the inner surface of said torsion-elastic element being operatively connected in torsional force transmitting relation to said linkage.

6. Apparatus according to claim 4 said movable mechanical linkage including a movable torque arm secured to said torsion-elastic element, said torque arm being secured in substantially fixed relation with respect to the interior surface of said tubular shaped element, and said wheel axle being secured in substantially fixed relation with respect to the exterior surface of said tubular shaped element.

7. Apparatus according to claim 4 wherein the distance from said stop to the axis of torsional movement of said torque arm of the axis of rotation of said wheel is less than the distance between the wheel axis and said pivot connection.

8. Apparatus according to claim 4 wherein said stop is adjustably movable with respect to the connection zone of said torque arm to said torsion-elastic element for a given angular position of said crank arm.

9. Apparatus according to claim 4 wherein said stop is non-circular on its external torque arm engaging surface.

10. Apparatus according to claim 4 wherein said stop is carried by said support.

11. A wheel suspension comprising a support, a crank arm pivotally connected to said support through a pivot connection and having a wheel axle rigidly disposed thereon and spaced from said pivotal connection, a wheel rotatably mounted substantially non-resiliently on said axle, a torsion-elastic unit secured at one portion thereof to said axle in torque-transmitting relation, said torsion-elastic unit being disposed at said axle and other than between said wheel and said axle, and movement restricting means operatively connected to another portion of said torsion elastic unit and spaced from said first portion.

12. Apparatus according to claim 11 wherein said movement restricting means includes a torque arm connected to said torsion-elastic unit and angularly movable with respect to said crank arm as a function of pivotal movement of said crank arm and a movement resistive element spaced from said pivot connection and the zone of connection of said torque arm to said torsion-elastic unit, said movement resistive element being engageable by said torque arm as a function of pivotal movement of said crank arm.

13. Apparatus according to claim 11 wherein said movement restricting means is adjustably movable to vary the torsional resistive load response as a function of crank arm movement.

14. Apparatus according to claim 11 wherein said movement resistive element is non-circular in shape on its torque arm engaging surface.

15. Apparatus according to claim 11 wherein said movement restricted means includes a torsional force resistive anchor element spaced from said wheel and torsion-elastic unit, and a mechanical linkage secured in torsional force transmitting relation by the said torsion-elastic unit and said torsional force resistive element.

References Cited by the Examiner
UNITED STATES PATENTS

| 2,082,798 | 6/37 | Herold | 16—5 X |
| 2,581,912 | 1/52 | Brown | 16—44 X |
| 2,700,172 | 1/55 | Huffman | 16—31 X |
| 3,041,656 | 7/62 | Goodall | 16—31 X |

FOREIGN PATENTS

| 881,079 | 11/61 | Great Britain. |

DONLEY J. STOCKING, *Primary Examiner.*

BERNARD A. GELAK, JOSEPH D. SEERS, *Examiners.*